Oct. 5, 1954

J. I. HAASE 2,690,784

STRIP APPLYING DEVICE

Filed March 26, 1951

INVENTOR.
JORGEN I. HAASE
BY
R. L. Miller
ATTORNEY

Oct. 5, 1954

J. I. HAASE 2,690,784

STRIP APPLYING DEVICE

Filed March 26, 1951

INVENTOR.
JORGEN I. HAASE

BY

*R. L. Miller*
ATTORNEY

Patented Oct. 5, 1954

2,690,784

UNITED STATES PATENT OFFICE 2,690,784

STRIP APPLYING DEVICE

Jorgen I. Haase, Akron, Ohio, assignor, by mesne assignments, to The Goodyear Tire & Rubber Company, a corporation of Ohio Application March 26, 1951, Serial No. 217,560

9 Claims. (Cl. 154—9)

This invention relates to a strip applying device, more particularly to an apparatus for applying strips to the side wall portion of a tire carcass during the building operation. The invention is particularly adapted for applying the strips to tire carcasses built on a crowned drum or core which necessitates the application of the chafing strips or other reenforcing strips to the generally radially extending portions of the carcass.

One object of the invention is to provide a strip applying apparatus of simple and economical construction.

Another object is to provide an apparatus that can be adapted for use in combination with many of the present types of tire building apparatus.

A further object of the invention is to provide a means that materially reduces the amount of time required to apply strip material to a tire carcass.

A particular object of the invention is to provide an apparatus that simplifies and hastens the application of chafing strips to a tire carcass during the building operation.

Still another object of this invention is to provide an apparatus that tensions one portion of a strip without substantially disturbing the remaining portion of the strip.

A still further object of the invention is to provide an apparatus that may be easily positioned to accommodate various sizes of tire building drums.

Other objects and advantages of this invention will become apparent hereinafter as the description thereof proceeds, the novel features, arrangements and combinations being clearly pointed out in the specification as well as the claims thereunto appended.

In modern tire building, vast strides have been made toward mechanizing the tire building operations, thus producing more uniform and higher quality tires at substantial reductions in cost. Even with these advancements, the building of the larger sizes of truck and other types of heavy duty tires requires considerable hand labor which is very difficult and strenuous for the tire builders. This invention provides an apparatus that further reduces the amount of hand labor required.

This apparatus is particularly adapted for applying chafing strips to the tire carcass, although it may be used for other strips which are applied to generally radially extending portions of a tire carcass. Strips of this type are generally formed of at least two straight plies of bias cut fabric so that they are stretchable. In order to apply these strips to such portions of a tire carcass, it is necessary to stretch the outer edge portions only to provide the greater peripheral length required at this position. Generally, the builder accomplishes this by stretching that portion of the strip by hand as he applies it to the carcass.

This apparatus provides a mechanical means of stretching the outer edge portion of the chafing strip only, thus eliminating the unavoidable inconsistencies of hand methods and also reducing the amount of time required for the application of the strip.

Figure 1:
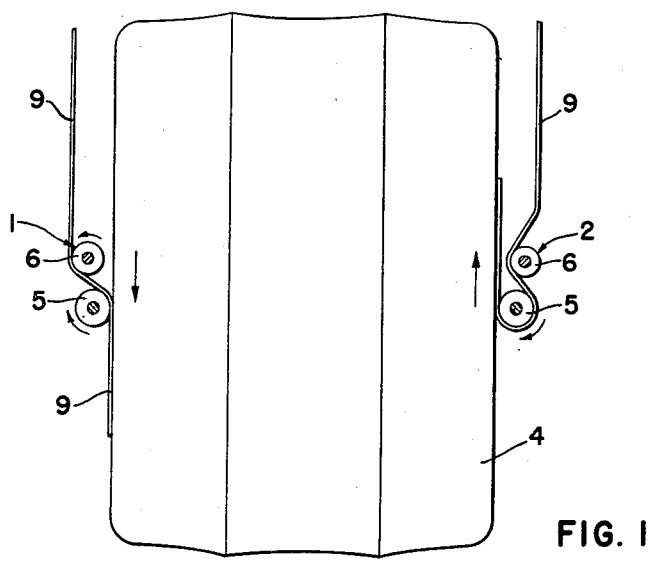
Fig. 1 is a schematic plan view of the invention.
Figure 2:
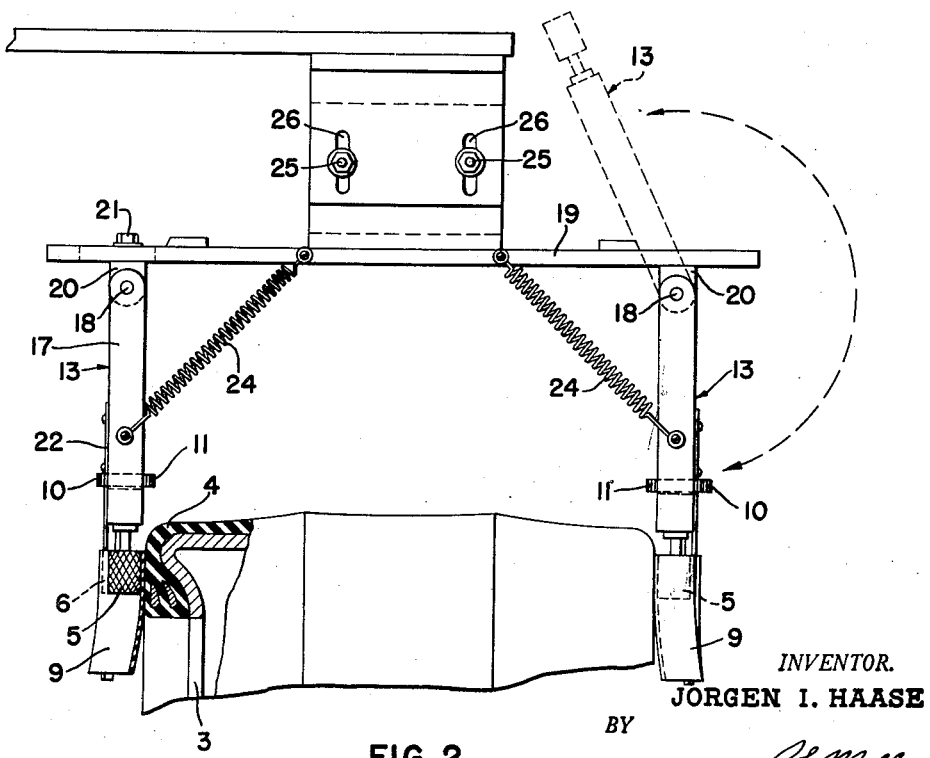
Fig. 2 is a front elevation.

In Figs. 1 and 2, the chafing strip applicators 1 and 2 are shown in the operative position with respect to the tire building drum 3 with a partially completed tire carcass 4 thereon. The drum 3, as illustrated, is the type commonly known as a "crown" drum but it is to be understood that the strip applicators may be used with any type of drum or core wherein the strip is to be applied in a generally radially extending plane or one having a substantial angle to the outer surface of the drum.

In the preferred form of the invention, the rolls 5 and 6, rotatably mounted on shafts 7 and 8, are cylindrical in shape and mounted with their peripheries in parallel relationship. The rolls 5 and 6 need be of such length so as to engage only the outer peripheral portion of the strip and are positioned with respect to the tire carcass 4 so that the outer peripheral portion of the chafing strip 9, after threading through the rolls 5 and 6 as shown in Fig. 1, is in the proper position for the application to the tire carcass. To stretch the outer portion of strip 9 for proper application, the roll 5 is slightly larger in diameter than roll 6 so that by rotating both rolls at the same shaft speed, the surface speed of roll 5 is greater than that of roll 6, which will stretch the portion of the strip 9 between the rolls 5 and 6. The same effect may be had by driving equal size rolls at different shaft speeds. Preferably, the peripheral surfaces of the rolls 5 and 6 are knurled to facilitate the stretching of the strip between the rolls by preventing relative movement between the strip 9 and the roll surfaces.

Figure 3:
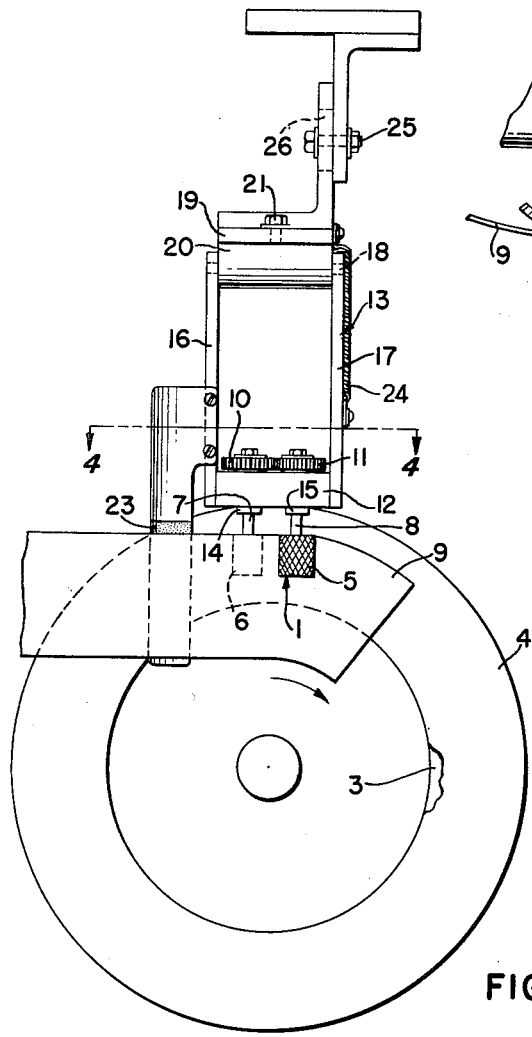
Fig. 3 is a side elevation.
Figure 4:
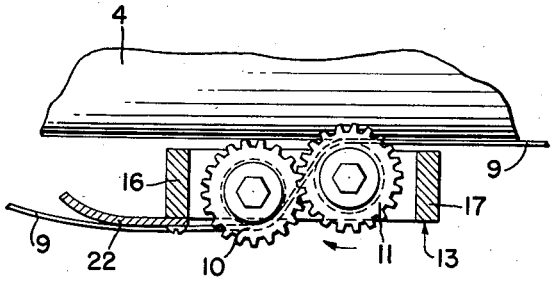
Fig. 4 is a section taken along line 4—4 of Fig. 3.
Figure 5:
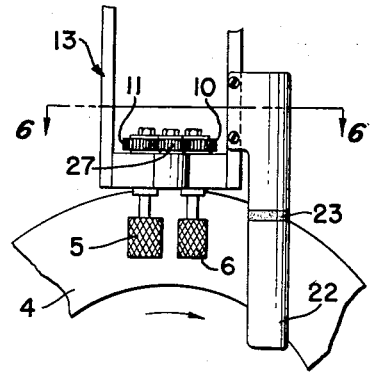
Fig. 5 is a modification of the invention.

The rolls 5 and 6 are mounted, as shown in Figs. 3 and 5, so that, in the operative position, the roll 5 contacts the tire carcass 4 and is rotated thereby as the building drum is rotated. Where used in the specification and claims, it is understood that reference to the apparatus being rotated by engagement with the tire or carcass includes such rotation imparted by the chafing strip interposed between the tire and roll 5 when the chafing strip is being applied. The roll 6 is spaced from roll 5 and also from the tire carcass 4 when the applicator is in the operative position, as shown in Fig. 1. Preferably, the shafts 7 and 8 are mounted in parallel relation although this is not necessary.

In order to provide for equal rotative speed of shafts 7 and 8, equal size gears 10 and 11 are attached to the portions of the shafts 7 and 8 extending through the cross member 12 of the mounting bracket 13 and gear members 10 and 11 are attached to the extending portion of shafts 7 and 8. Collars 14 and 15 retain the shafts 7 and 8 in the desired position. As the tire drum 3 is rotated, roll 5 is rotated, which in turn, through gears 10 and 11, drives roll 6 whereby the portion of the strip 9 between rolls 5 and 6 is stretched by the difference in peripheral speeds of the rolls 5 and 6 and roll 5 presses the strip 9 on the tire carcass in the stretched condition. The use of gear members 10 and 11 in combination with different diameter rolls 5 and 6 is only illustrative as one method of obtaining a predetermined amount of stretch in the strip 9. Other means may be used as will be readily apparent to anyone skilled in the art.

The mounting bracket 13 consists of cross member 12 and side members 16 and 17 fastened to the opposite ends of cross member 12. The mounting brackets 13 of the applicators 1 and 2 are mounted on pivots 18 attached to supporting arm 19 by means of mounting 20 so that they may be pivoted out of the operative position to the position indicated by the dotted lines in Fig. 2. As illustrated, the arm 19 is provided with slots toward each end to permit the pivotal mountings 20 for the applicators 1 and 2 to be located properly for the various widths of building drums that may be used on the tire machine. The pivotal mountings 20 are held in the proper position by tightening the cap screws 21. Preferably, a guide 22 is fastened to the member 16 so as to extend past the rolls 5 and 6 to aid the tire builder in accurately feeding the strip 9 through the rolls for application to the carcass. In order that the tire builder may properly align the strip as it is fed over the guide, a band 23 of paint or tape is placed on the guide 22 so that the lower edge of the band 23 indicates the correct position for the edge of the strip 9 as it is fed to the rolls. It is only necessary to change the location of the band 23 to alter the position of the strip 9 as it is fed to the rolls. As shown in Fig. 2, a tension spring 24 is attached to the side member 17 and the supporting arm 19 to urge the roll 5 into contact with the tire carcass when in the operative position and to maintain the applicator in an out-of-the-way position when not in use.

The assembly of the supporting arm 19 and the applicators 1 and 2 is preferably adjustably mounted relative to the building drum, such as by a pin 25 and slot 26 connection. This mounting allows the assembly to be positioned so as to accommodate the diameters of the building drums which may be used on the building machine.

It is to be understood that the embodiment described is only illustrative and that other shapes of rolls and mounting positions may be used to accomplish the same results or meet the need for a specific application of the apparatus.

In operation, the applicators 1 and 2 are swung down into the operative position and then the chafing strip 9 is threaded through the rolls 6 and 5 of applicator 1 as shown in Fig. 1 with the free end of the strip extending toward the back side of the tire building machine. The tension spring 24 causes the roll 5 to press the strip 9 against the tire carcass and as the tire drum is rotated in the direction indicated by the arrow adjacent applicator 1 in Fig. 1. The operator guides the strip over the guide 22 as it is drawn through the rolls 5 and 6 of applicator 1 by the drum rotation so that the strip is applied to the tire carcass in the proper position. The outer peripheral portion of the chafing strip 9 between the rolls is stretched slightly and is tacked or adhered to the tire carcass in this condition.

Since chafing strips are usually formed of two or more plies of fabric in staggered relationship, it is desirable to apply the chafing strip with applicator 2 in the opposite direction so that the splice may be more easily made. It is generally more convenient to apply both chafing strips from the back side of the tire building machine so it is preferable to thread the strip 9 through the applicator 2 in the manner shown in Fig. 1. The tire drum is then rotated in the direction indicated by the arrow adjacent applicator 2, causing the strip to be applied in the desired direction. If the strips to be applied are of a symmetrical construction, both applicators may be used in the same manner.

After the strips are so applied, the inner peripheral portions which are substantially unstretched are worked down on the carcass by hand and are then usually stitched by mechanical stitchers (not shown) in a manner well known in the art. The applicators are then swung to the inoperative position and the tire carcass is completed in the usual manner. Because of the great amount of auxiliary apparatus that is generally located in front of the building drum, it is preferable to feed the chafing strips through to applicators from the back of the machine. This not only makes the application of the strip more simple but also more safe, although it is not essential that it be done in this manner.

Figure 6:
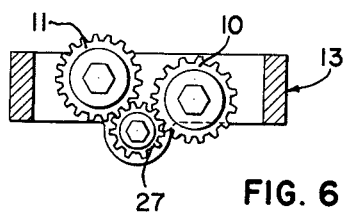
Fig. 6 is a section taken along line 6—6 of Fig. 5.
Figure 7:
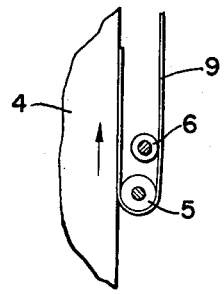
Fig. 7 illustrates one application of the apparatus shown in Figs. 5 and 6.

Another method of applying the strip 9 to the tire carcass by applicator 2 in the opposite direction to that of the applicator 1 is illustrated in Figs. 5, 6 and 7, in which an idler gear 27 is placed between gears 10 and 11 to cause the roll 6 to be rotated in the same direction as roll 5. This direction of rotation is required when the strip 9 is threaded through the applicator as shown in Fig. 7, in which the strip is passed over roll 6 and over and around roll 5 so that the forward end of the strip extends toward the back side of the tire machine. The tire drum is rotated in the direction indicated by the arrow in Fig. 7. The differential of peripheral speeds of rolls 5 and 6 will stretch the portion of the strip between the rolls and apply it to the tire carcass in the stretched condition, as previously described.

While certain representative embodiments and details have been shown for the purpose of illustrating the invention, it will be apparent to those skilled in this art that various changes and modifications may be made therein without departing from the spirit or scope of the invention.

I claim:

1. In a device of the class described, the combination with a tire building machine having a rotatable crown type building drum in which the end surfaces extend downwardly toward the axis of the drum of a chafing strip applicator for applying a chafing strip to a portion of the carcass on the end surfaces of said drum, said applicator comprising a roll adjacent one end of the drum with its axis lying at a substantial angle to the axis of rotation of the drum, said roll being mounted for frictional engagement with said carcass and for rotation when in engagement therewith, a cooperating roll in spaced relation to said first-mentioned roll, and means for imparting rotation of the cooperating roll at a peripheral speed less than that of the first roll whereby the portion of the chafing strips contacting the rolls is stretched as it engages the rolls in succession while being applied to the carcass.

2. In a device of the class described, the combination with a tire building machine having a rotatable crown type building drum in which the end surfaces extend downwardly toward the axis of the drum of a chafing strip applicator for applying a chafing strip to a portion of the carcass on the end surfaces of said drum, said applicator comprising a roll adjacent one end of the drum with its axis lying at a substantial angle to the axis of rotation of the drum, said roll being mounted for frictional engagement with said carcass and for rotation when in engagement therewith, a cooperating roll in spaced relation to said first-mentioned roll, and means for imparting rotation of the cooperating roll at a peripheral speed less than that of the first roll, the peripheral surface of said rolls being roughened to prevent relative movement between the roll surfaces and chafing strip whereby the portion of the chafing strips contacting the rolls is stretched as it engages the rolls in succession while being applied to the carcass.

3. In a device of the class described, the combination with a tire building machine having a rotatable crown type building drum in which the end surfaces extend downwardly toward the axis of the drum of a chafing strip applicator for applying a chafing strip to a portion of the carcass on the end surfaces of said drum, said applicator comprising a roll adjacent one end of the drum with its axis lying at a substantial angle to the axis of rotation of the drum, said roll being mounted for frictional engagement with said carcass and for rotation when in engagement therewith, a cooperating roll rotatably mounted in spaced relation to the first roll and so positioned that it is in spaced relation to the carcass when said first roll is in contact with the carcass, and means for imparting rotation to said cooperating roll at a peripheral speed less than that of the first roll whereby the portion of the chafing strips contacting the rolls is stretched as it engages the rolls in succession while being applied to the tire carcass, the peripheral surfaces of said rolls being roughened to prevent relative movement between the roll surfaces and chafing strip.

4. In a machine having a rotatable crown drum adapted for building tire carcasses thereon which includes chafing strips, that improvement which comprises a chafing strip applicator, including a pair of rolls adjacent one end of the drum having their axes at a substantial angle to the axis of rotation of the drum, means for urging one of said rolls against said carcass into driving contact therewith, the second roll being mounted in spaced relation to said first-mentioned roll and said tire carcass, and means for driving said second roll at a peripheral speed less than that of said contacting roll whereby the portion of the chafing strip contacting the rolls is stretched as it engages the rolls in succession while being applied to the tire carcass.

5. In a machine having a crown drum adapted for building tire carcasses thereon which includes chafing strips, that improvement which comprises a chafing strip applicator, including a pair of rolls adjacent one end of the drum having their axes extending at a substantial angle to the axis of rotation of the drum, means for urging one of said rolls against said carcass into driving contact therewith, the second roll being mounted in spaced relation to said first-mentioned roll and said tire carcass, means for driving said second roll at a peripheral speed less than that of said contacting roll, and guide means associated with said rolls for guiding the chafing strip to said applicator rolls, said rolls adapted to impart stretch to the section of a chafing strip contacting the rolls as it is fed through the rolls for engagement with the tire carcass.

6. In a device of the class described, the combination with a tire building machine having a rotatable crown type building drum of a chafing strip applicator for applying chafing strips to a carcass thereon, said applicator comprising a pair of rolls, means for rotatably mounting one of said rolls, means for urging the same into driving contact with the tire carcass, means for rotatably mounting the second roll in spaced relation to the first roll and so positioned that it is in spaced relation to the carcass when said first roll is in contact with the carcass, and means for driving the first roll at a different peripheral speed than the second roll whereby the portion of the chafing strip contacting the rolls is stretched as it engages the rolls in succession while being applied to the tire carcass.

7. In a device of the class described, the combination with a tire building machine having a crown type building drum of a chafing strip applicator for applying chafing strips to a carcass thereon, said applicator comprising a pair of rolls, means for rotatably mounting one of said rolls, means for urging the same into driving contact with the tire carcass, means for rotatably mounting the second roll in spaced relation to the first roll and so positioned that it is in spaced relation to the carcass when said first roll is in contact with the carcass, and means for driving the first roll at a greater peripheral speed than the second roll whereby the portion of the chafing strip contacting the rolls is stretched as it engages the rolls in succession while being applied to the tire carcass.

8. In a machine for building a tire carcass on which there is a rotatable drum having an end portion thereof at an angle to the outer peripheral surface thereof, the combination of means for applying and stitching a portion only of a strip to be applied to a tire carcass on said end portion, said strip applying device having a pair of feed rolls, one of which is mounted for engagement with the strip of material only along one edge thereof and pressing the same against the tire carcass as the drum rotates relative to said strip applying device, the other of said rolls being spaced from said first roll and drum and rotated in unison therewith when said first roll is rotated but at a lower peripheral speed whereby the portion of the chafing strip contacting the rolls is stretched as it engages the rolls in succession while being applied to the tire carcass, the said first roll being actuated, during the time it is in operative position, at a surface speed substantially that of the adjacent surface of said drum.

9. In a device of the class described, the combination with a tire building machine having a rotatable crown type building drum in which the end surfaces extend downwardly toward the axis of the drum, of a chafing strip applicator for applying a chafing strip to a portion of the carcass on the end surfaces of said drum, said applicator comprising a roll adjacent one end of the drum having its axis lying at a substantial angle to the axis of rotation of the drum, said roll being mounted for frictional engagement with said carcass and for rotation when in engagement therewith, a cooperating roll in spaced relation to said first-mentioned roll, and means for imparting rotation of the cooperating roll at a peripheral speed less than that of said first-mentioned roll, both of said rolls being adapted to engage only a portion of the width of the chafing strip whereby the portion of the chafing strips contacting the rolls is stretched as it engages the rolls in succession while being applied to the carcass.

References Cited in the file of this patent

UNITED STATES PATENTS

| Number | Name | Date |
|---|---|---|
| 2,039,532 | Heston | May 5, 1936 |
| 2,041,990 | Breth et al. | May 26, 1936 |
| 2,451,973 | Purdy | Oct. 19, 1948 |
| 2,541,506 | Cuthbertson | Feb. 13, 1951 |
| 2,556,264 | Flynn | June 12, 1951 |
| 2,567,150 | Frazier et al. | Sept. 4, 1951 |
| 2,577,476 | Nashley | Dec. 4, 1951 |
| 2,588,207 | Cleland et al. | Mar. 4, 1952 |